United States Patent
Abbott et al.

(10) Patent No.: US 7,191,441 B2
(45) Date of Patent: Mar. 13, 2007

(54) METHOD AND APPARATUS FOR SUSPENDING A SOFTWARE VIRTUAL MACHINE

(75) Inventors: Paul Harry Abbott, Kings Somborne (GB); Matthew Paul Chapman, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 10/213,048

(22) Filed: Aug. 6, 2002

(65) Prior Publication Data

US 2003/0033344 A1 Feb. 13, 2003

(30) Foreign Application Priority Data

Aug. 6, 2001 (GB) .................................. 0119066.9

(51) Int. Cl.
  G06F 9/455 (2006.01)
  G06F 9/46 (2006.01)
  G06F 9/44 (2006.01)
  G06F 12/00 (2006.01)

(52) U.S. Cl. .................. 718/1; 718/100; 718/108; 719/330; 717/129; 711/129; 711/161

(58) Field of Classification Search ............ 718/1–108; 719/330; 709/226; 711/129, 135, 161; 717/129
See application file for complete search history.

(56) References Cited

U.S. PATENT DOCUMENTS

| | | | | |
|---|---|---|---|---|
| 4,912,628 A | 3/1990 | Briggs | ......................... | 364/200 |
| 5,966,540 A | 10/1999 | Lister et al. | ................ | 395/712 |
| 6,421,739 B1* | 7/2002 | Holiday | ....................... | 719/330 |
| 6,718,538 B1* | 4/2004 | Mathiske | ..................... | 717/129 |
| 6,760,815 B1* | 7/2004 | Traversat et al. | ............ | 711/135 |
| 6,854,115 B1* | 2/2005 | Traversat et al. | .............. | 718/1 |
| 6,934,755 B1* | 8/2005 | Saulpaugh et al. | ......... | 709/226 |
| 7,093,086 B1* | 8/2006 | van Rietschote | ............ | 711/161 |
| 2002/0099753 A1* | 7/2002 | Hardin et al. | .................. | 709/1 |

FOREIGN PATENT DOCUMENTS

EP 1011043 6/2000
JP 4155533 5/1992

OTHER PUBLICATIONS

Bouchenak et al., "Pickling Threads State in the Java System", 1999, Citeseer, pp. 1-11.*
Suezawa, "Persistent Execution State of Java Virtual Machine", 2000, ACM, pp. 160-167.*

(Continued)

Primary Examiner—Meng-Al T. An
Assistant Examiner—Jennifer N. To
(74) Attorney, Agent, or Firm—Dillon & Yudell

(57) ABSTRACT

A computer system includes a software virtual machine (such as Java) for running one or more applications. An object is provided that is responsive to a call from an application for placing the virtual machine and application into a state of suspension. This involves interrupting all current threads, and recording the state of the components of the virtual machine, including heap, threads, and stack, into a serialization data structure. Subsequently the serialization data structure can be invoked to resume the virtual machine and application from the state of suspension. Note that many virtual machines can be cloned from the single stored data structure. One benefit of this approach is that a new virtual machine can effectively be created in an already initialized state.

36 Claims, 8 Drawing Sheets

OTHER PUBLICATIONS

Java Grande Conference, "Proceedings of the ACM 2000 Conference on Java Grande", Jun. 2000, pp. 1-3.*

Dearle et al., "Persistent Operating System Support for Java", 1996, Department of Computing Science, University of Stirling, pp. 1-8.*

Howell, "Straightforward Java Persistence Through Checkpointing", 1998, Department of Computer Science, Dartmouth College, Hanover, pp. 1-14.*

Hong, et al; Proc 6$^{th}$ Int Conf. On Computer Supported Cooperative Work desig; Jul. 12-14, 2001; IEEE; p. 313-318; A strong migration method of mobile Agents based on Java.

Funfrocken; Mobile Agents. Second International Workshop, MA '98;Sep. 9-11, 1998; p. 26-37; Transparent migration of Java-based mobile agents. Capturing and reestablishing the state of Java Programs.

* cited by examiner

METHOD AND APPARATUS FOR SUSPENDING A SOFTWARE VIRTUAL MACHINE

FIELD OF THE INVENTION

The present invention relates to a computer system supporting a software virtual machine, and in particular a system wherein the virtual machine and application can be stored in a suspended state for later resumption.

BACKGROUND OF THE INVENTION

Programs written in the Java programming language (Java is a trademark of Sun Microsystems Inc) are generally run in a virtual machine environment, rather than directly on hardware. Thus a Java program is typically compiled into byte-code form, and then interpreted by a Java virtual machine (VM) into hardware commands for the platform on which the Java VM is executing. The Java VM itself is an application running on the underlying operating system. An important advantage of this approach is that Java applications can run on a very wide range of platforms, providing of course that a Java VM is available for each platform.

Java is an object-oriented language. Thus a Java program is formed from a set of class files having methods that represent sequences of instructions. One Java object can call a method in another Java object. A hierarchy of classes can be defined, with each class inheriting properties (including methods) from those classes which are above it in the hierarchy. For any given class in the hierarchy, its descendants (i.e. below it) are called subclasses, whilst its ancestors (i.e. above it) are called superclasses.

At run-time classes are loaded into the Java VM by one or more class loaders, which are themselves organised into a hierarchy. Objects can then be created as instantiations of these class files, and indeed the class files themselves are effectively loaded as objects. In recent years the Java environment has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard Java VM architecture is generally designed to run only a single application, although this can be multi-threaded. In a server environment used for database transactions and such-like, each transaction is typically performed as a separate application, rather than as different threads within an application. This is to ensure that every transaction starts with the Java VM in a clean state. In other words, a new Java VM is started for each transaction. Unfortunately however this results in an initial delay in running the application (the reasons for this will be described in more detail later). The overhead due to having to start up (and then stop) a fresh Java VM for each new application can seriously degrade the scalability of Java server solutions.

Various attempts have been made to mitigate this problem. EP-962860-A describes a process whereby one Java VM can fork into a parent and a child process, this being quicker than setting up a fresh Java VM. The ability to run multiple processes in a Java-like system, thereby reducing overhead per application, is described in "Processes in KaffeOS: Isolation, Resource Management, and Sharing in Java" by G Back, W Hsieh, and J Leprean (see: /flux/papers/ kaffeos-osdi00/main.html at cs.utah.edu). Another approach is described in "Oracle JServer Scalability and Performance" by Jeremy Litzt, July 1999 (see: database/documents/jserver_scalability_and_performance_twp.pdf at The JServer product available from Oracle Corporation, USA, supports the concept of multiple sessions (a session effectively representing a transaction or application). Resources such as read-only bytecode information are shared between the various sessions, but each individual session appears to its client to be a dedicated conventional Java VM.

U.S. patent application Ser. No. 09/304,160, filed Apr. 30, 1999 ("A long Running Reusable Extendible Virtual Machine"), assigned to IBM Corporation, discloses a virtual machine having two types of heap, a private heap and a shared heap. The former is intended primarily for storing application classes, whilst the latter is intended primarily for storing system classes and, as its name implies, is accessible to multiple VMs. A related idea is described in "Building a Java virtual machine for server applications: the JVM on OS/390" by Dillenberger et al, IBM Systems Journal, Vol 39/1, January 2000. Again this implementation uses a shared heap to share system and potentially application classes for reuse by multiple workers, with each worker Java VM also maintaining a private or local heap to store data private to that particular Java VM process.

The above documents are focused primarily on the ability to easily run multiple Java VMs in parallel. A different (and potentially complementary) approach is based on a serial rather than parallel configuration. Thus it is desirable to run repeated transactions (i.e. applications) on the same Java VM, since this could avoid having to reload all the system classes at the start of each application. However, one difficulty with this is that each application expects to run on a fresh, clean, Java VM. There is a danger with serial re-use of a Java VM that the state left from a previous transaction may somehow influence the outcome of a new transaction. This unpredictability is quite unacceptable in most circumstances.

U.S. patent application Ser. No. 09/584,641 filed May 31, 2000 in the name of IBM Corporation discloses an approach for providing a Java VM with a reset capability. U.S. provisional application No. 60/208,268 also filed May 31, 2000 in the name of IBM Corporation discloses the idea of having two heaps in a Java VM. One of these is a transient heap, which is used to store transaction objects that will not persist into the next transaction, whilst a second heap is used for storing objects, such as system objects, that will persist. This approach provides the basis for an efficient reset mechanism by simply deleting the transient heap.

The techniques described above, whether involving a parallel or serial configuration, are generally designed for continuous usage without interruption, and generally entail a more complicated interaction with an application. They are therefore primarily intended for a server environment. In contrast, a PersonalJava software product (now part of Java 2 Microedition, J2ME) has been developed by Sun Microsystems Inc. for use on small handheld devices (also known as pervasive, consumer or Tier 0 devices). It is believed that one of the features used by PersonalJava software is that rather than individually load system classes at start-up, a file is stored representing the heap with all the desired system classes already loaded. Thus when the Java VM is started, this file is copied en bloc to form the new heap, saving the time of loading all the classes separately. Although this technique provides a useful optimisation, it is effectively predefined in nature which limits its flexibility and scope.

In addition, in "Signing, sealing and guarding Java objects", by Gong and Schemers, p206–216, in "Mobile Agents and Security, Springer-Verlag, July 98, Berlin, Germany it is suggested that a signed object (i.e. having a digital signature to protect against tampering) could be used "to restart a JVM from a previously saved state". The context of this is unclear, but it is probably similar in intention to the above-described Personal Java approach.

SUMMARY OF THE INVENTION

Accordingly, the invention provides a method of saving in suspended form an application running on a software virtual machine on a computer system, comprising the steps of:

receiving a call from an application for placing the virtual machine and application into a state of suspension;

determining the current state of the components of the virtual machine, including heap, threads, and stack; and storing the determined state into a save file.

The principle underlying the present invention is serialisation, whereby a "snapshot" is taken of the VM state, which is then stored in a file (serialization). This file is designed for subsequent restoration (deserialization). Although it is well-known in a Java environment to serialize individual objects, by converting them into a stream of bytes, which can then, for example, be stored locally, or transmitted across a network, serialising the state of an entire VM goes significantly beyond simply serialising one or more objects. Likewise, loading pre-initialised classes is known both from Sun's Personal Java and some of the work on shared heaps as described above, but this again falls far short of serialising the entire VM plus application.

Another situation where saving a system state is known is in laptop computers, where to conserve power, the system will effectively "sleep" or hibernate if there is no user input for a predetermined time period. This involves saving the current state of the system, for restart when the user subsequently does make an entry. Note that the sleep function on a portable computer is driven automatically by the operating system, rather than by a specific application call.

In addition, the issues involved in hibernation are rather different from those faced by the present invention, in that the entire physical state of the machine is saved and restored, in essentially identical fashion, onto the same machine. In contrast, in saving a virtual machine, one must allow for the fact that it may be restored at an arbitrary memory location, possibly on a completely different machine, and potentially many times from the same save file. On the other hand, there are some advantages in working with a virtual machine, for example the various components are more accessible and flexible since they are implemented primarily in software.

The ability to create the save file in response to an application call provides optimum control as regards the time the snapshot is taken. As described in more detail below, this can then be exploited to minimise the restore time, thereby providing a much shorter start-up time than conventional initialisation of a virtual machine. A particular benefit of this approach is where multiple, identical, VMs can all be rapidly launched from a single save file. In addition, the snapshot can be transmitted over a network, thereby allowing resumption on another system, for example for diagnostic purposes.

In a preferred embodiment, absolute references on the stack must be replaced by symbolic references to ensure that they are valid at restore. Likewise, absolute references on the heap are replaced by relative references before storing the save file. This is because there is no guarantee that when restored the heap will be loaded into the same memory location, and hence any saved absolute references would be invalid. One preferred way of implementing this is to create a linked list of the relative references for each object. This has the advantage that these references can then be very quickly recreated at restore time (and it will be appreciated that a fast restore is a key objective, thereby avoiding the initialisation delays of the prior art).

In a preferred embodiment, the creation of the save file is abandoned if there are any pinned objects on the heap (i.e. objects referenced from the stack). The reason for this is that it is not possible to look at a data value on the stack and say categorically whether it is an object reference (and so needs converting from absolute to relative format) or whether it is some other data value (in which case any conversion would lead to an erroneous result). In the current implementation the VM automatically flags pinned objects on the heap itself (to avoid them being garbage collected), so the determination of pinned objects is very straightforward. Nevertheless, even without this facility, pinned objects can be quickly identified by scanning the stack for any data values that potentially reference objects on the heap.

The preferred embodiment provides the user with various options, as to whether certain actions should be performed prior to determining the current state of the components of the virtual machine. Examples of such actions include performing a garbage collection, and forcing compilation of at least some of the application. The motivation is that any operations which can be performed before the snapshot do not then need to be performed at restart (or later). This strategy is particularly beneficial if the application is to be restarted multiple times from the same save file. In other circumstances however, for example where the snapshot is being used for diagnostic purposes, it may be preferable for a user not to invoke these options.

In general it is desirable to perform at least a partial initialisation of the application prior to the call from the application to place the virtual machine and application into a state of suspension. In particular, it is recommended that initialisation of the application be divided into two parts; the former generic, which can be saved in the snapshot, and the latter run-specific, which is only completed at restore. In this way the maximum feasible amount of initialisation is performed prior to the snapshot, in line with the objective of minimising the time taken for the restore operation. Note that after the snapshot has been taken, the application that called the save routine may itself either continue or terminate (in the preferred embodiment this is a user option).

The invention further provides a method of restoring a suspended application running on a software virtual machine (VM) on a computer system from a save file, comprising the steps of:

retrieving a save file;

recreating the components of the virtual machine, including heap, threads, and stack, from data in the save file; and restarting application.

The invention further provides a save tool for storing the suspended state of an application running on a software virtual machine on a computer system, said save tool comprising:

means for receiving a call from an application for placing the virtual machine and application into a state of suspension;

means for determining the current state of the components of the virtual machine, including heap, threads, and stack; and means for storing the determined state into a save file.

The invention further provides a restore tool for restoring a suspended application running on a software virtual machine (VM) on a computer system from a save file, comprising:

means for retrieving a save file;

means for recreating the components of the virtual machine, including heap, threads, and stack, from data in the save file; and means for restarting application The invention further provides a computer program product comprising instructions encoded on a computer readable medium for causing a computer to perform the methods described above. A suitable computer readable medium may be a DVD, CD-ROM or such-like. Alternatively, the instructions may be encoded in a signal transmitted over a network from a server.

It will be appreciated that the tools and computer program product of the invention will benefit from the same preferred features as the system of the invention.

BRIEF DESCRIPTION OF THE DRAWINGS

A preferred embodiment of the invention will now be described in detail by way of example only with reference to the following drawings.

DETAILED DESCRIPTION

Figure 1:
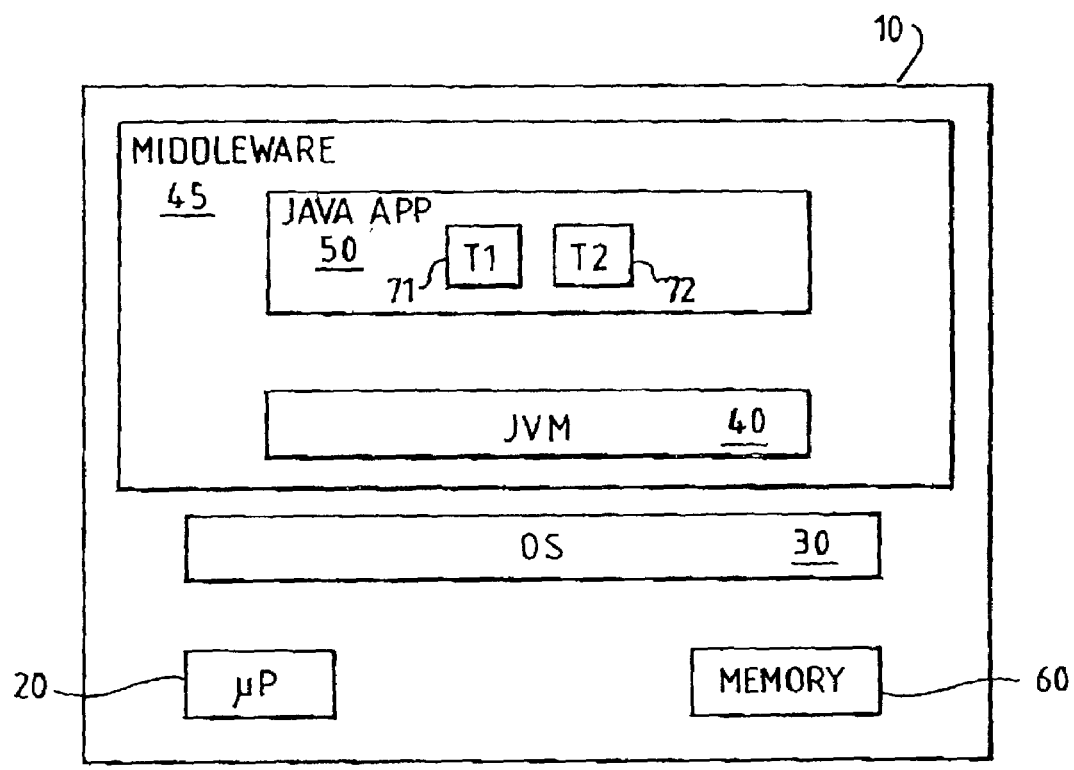
FIG. 1 shows a schematic diagram of a computer system supporting a Java Virtual Machine (VM)

FIG. 1 illustrates a computer system 10 including one or more (micro)processors 20 which are used to run software loaded into memory 60. The software can be loaded into the memory by various means (not shown), for example from a removable storage device such as a floppy disk, CD ROM, or DVD, or over a network such as a local area network (LAN), telephone/modem connection, or wireless link, typically via a hard disk drive (also not shown). Computer system runs an operating system (OS) 30, on top of which is provided a Java virtual machine (VM) 40. The Java VM looks like an application to the (native) OS 30, but in fact functions itself as a virtual operating system, supporting Java application 50. A Java application may include multiple threads, illustrated by threads T1 and T2 71, 72.

In one preferred embodiment, system 10 also supports middleware subsystem 45, for example a transaction processing environment such as the CICS program, available from IBM Corporation (CICS is a trademark of IBM Corporation). The middleware subsystem runs as an application or environment on operating system 30, and initiates the Java VM 40. The middleware also includes Java programming which acts to cause transactions as Java applications 50 to run on top of the Java VM 40. In a typical server environment, multiple Java VMs may be running on computer system 10, in one or more middleware environments.

It will be appreciated that computer system 10 can be a standard personal computer or workstation, network computer, minicomputer, mainframe, or any other suitable computing device, and will typically include many other components (not shown) such as display screen, keyboard, sound card, network adapter card, etc. which are not directly relevant to an understanding of the present invention. Note that computer system 10 may also be an embedded system, such as a set top box, handheld device, or any other hardware device including a processor 20 and control software 30, 40.

Figure 2:
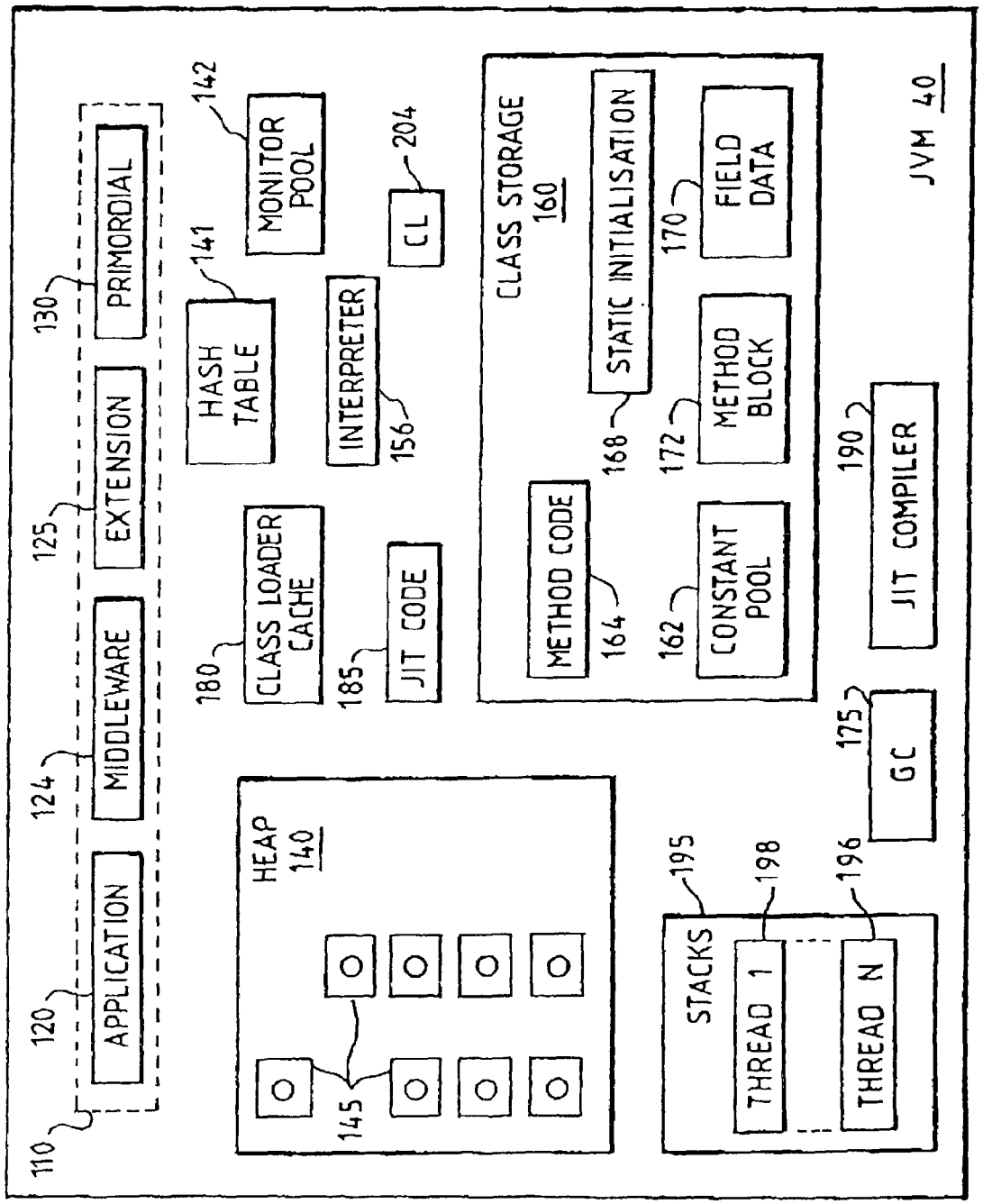
FIG. 2 is a schematic diagram of the internal structure of the Java VM.

FIG. 2 shows the structure of Java VM 40 in more detail (omitting some components which are not directly pertinent to an understanding of the present invention). The fundamental unit of a Java program is the class, and thus in order to run any application the Java VM must first load the classes forming and required by that application. For this purpose the Java VM includes a hierarchy of class loaders 110, which conventionally includes three particular class loaders, named Application 120, Extension 125, and Primordial 130. An application can add additional class loaders to the Java VM. In the embodiment illustrated in FIG. 2 a fourth class loader is also supported, Middleware 124.

For each class included within or referenced by a program, the Java VM effectively walks up the class loader hierarchy, going first to the Application class loader, then the Middleware loader, then the Extension class loader, and finally to the Primordial class loader, to see if any class loader has previously loaded the class. If the response from all of the class loaders is negative, then the Java VM walks back down the hierarchy, with the Primordial class loader first attempting to locate the class, by searching in the locations specified in its class path definition. If this is unsuccessful, the Extension class loader then makes a similar attempt, if this fails the Middleware class loader tries. Finally, if this fails the Application class loader tries to load the class from one of the locations specified in its class path (if this fails, or if there is some other problem such as a security violation, the system returns an error). It will be appreciated that a different class path can be defined for each class loader.

The Java VM further includes a component CL 204, which also represents a class loader unit, but at a lower level. In other words, this is the component that actually interacts with the operating system to perform the class loading on behalf of the different (Java) class loaders 110.

Also present in the Java VM is a heap 140, which is used for storage of objects 145. Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2). Although heap 140 is shared between all threads, typically for reasons of operational efficiency, certain portions of heap 140 can be assigned to individual threads, effectively as a small region of local storage, which can be used in a similar fashion to a cache for that thread.

The Java VM also includes a class storage area 160, which is used for storing information relating to the class files stored as objects in the heap 140. This area includes the method code region 164 for storing byte code for implementing class method calls, and a constant pool 162 for storing strings and other constants associated with a class.

The class storage area also includes a field data region 170 for sharing static variables (static in this case implies belonging to the class rather than individual instances of the class, or, to put this another way, shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc. in class storage area 160. They also contain a reference to the class loader which loaded them into the heap, plus other fields such as a flag (not shown) to indicate whether or not they have been initialised.

FIG. 2 further shows a monitor pool 142. This contains a set of locks (monitors) that are used to control access to an object by different threads. Thus when a thread requires exclusive access to an object, it first obtains ownership of its corresponding monitor. Each monitor can maintain a queue of threads waiting for access to any particular object. Hash table 141 is used to map from an object in the heap to its associated monitor.

Another component of the Java VM is the interpreter 156, which is responsible for reading in Java byte code from loaded classes, and converting this into machine instructions for the relevant platform. From the perspective of a Java application, the interpreter effectively simulates the operation of a processor for the virtual machine.

Also included within the Java VM are class loader cache 180 and garbage collection (GC) unit 175. The former is a table used to allow a class loader to trace those classes which it initially loaded into the Java VM. The class loader cache therefore permits each class loader to check whether it has loaded a particular class—part of the operation of walking the class loader hierarchy described above. Note also that it is part of the overall security policy of the Java VM that classes will typically have different levels of permission within the system based on the identity of the class loader by which they were originally loaded.

Garbage collection (GC) facility 175 is used to delete objects from heap 140 when those objects are no longer required. Thus in the Java programming language, applications do not need to specifically request or release memory, rather this is controlled by the Java VM. Therefore, when Java application 50 creates an object 145, the Java VM secures the requisite memory resource. Then, when Java application 50 finishes using object 145, the JVM can delete the object to free up this memory resource. This latter process is known as garbage collection, and is generally performed by briefly interrupting all threads 71, 72, and scanning the heap 140 for objects which are no longer referenced, and hence can be deleted.

One complication is that a class may contain a finaliser method, which in accordance with the Java specification must be run before the class can be deleted. Typically the way that this is handled by the garbage collector 175 is that any object which could potentially be deleted apart from needing to run its finaliser method is retained in a special queue (not shown in FIG. 2). When the current garbage collection cycle has completed and the normal application threads are resumed, a special finaliser thread then calls any queued finaliser methods. Once the processing associated with the finaliser method has completed, the object is then available to be garbage collected in the next cycle.

The Java VM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later (perhaps repeatedly) by the interpreter 156.

Another component of the Java VM is the stack area 195, which is used for storing the stacks 196, 198 associated with the execution of different threads on the Java VM. Note that because the system libraries and indeed parts of the Java VM itself are written in Java, and these frequently use multithreading, the Java VM may be supporting multiple threads even if the user application 50 running on top of the Java VM contains only a single thread itself.

It will be appreciated of course that FIG. 2 is simplified, and essentially shows only those components pertinent to an understanding of the present invention. Thus for example the heap may contain thousands of Java objects in order to run Java application 50, and the Java VM typically contains many other components (not shown) such as diagnostic facilities, etc.

Figure 3:
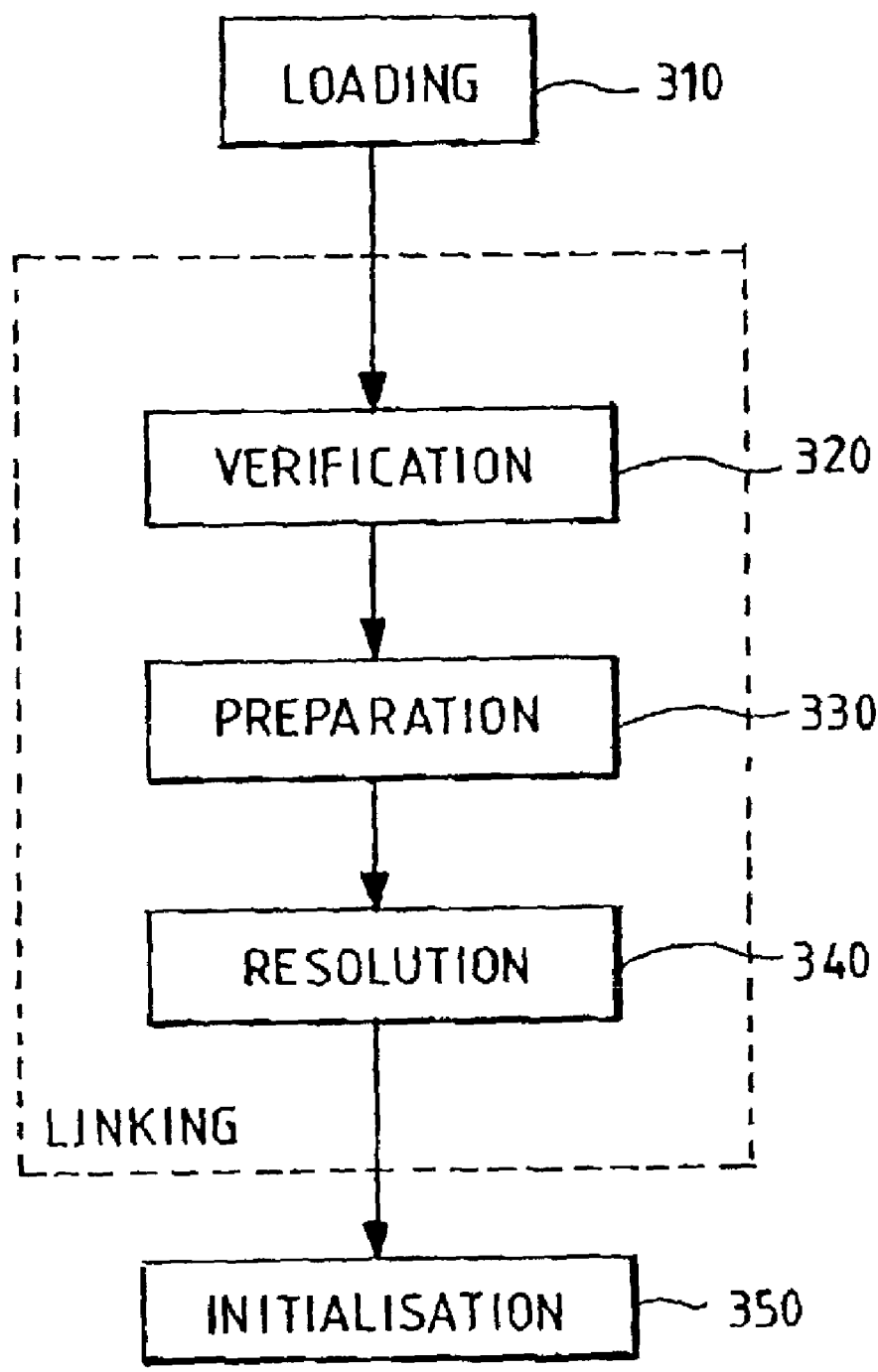
FIG. 3 is a flowchart depicting the steps required to load a class and prepare it for use.

FIG. 3 is a flowchart illustrating the operations conventionally performed to load a class in order to run a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the Java VM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the Java VM implementation how many classes are loaded at this stage, as opposed to waiting until such classes are actually needed before loading them.

The final step in FIG. 3 is the initialisation of a loaded class (step 350), which represents calling the static initialisation method (or methods) of the class. According to the formal Java VM specification, this initialisation must be performed once and only once before the first active use of a class, and includes things such as setting static (class) variables to their initial values (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class object 145 is set as part of the initialisation process, thereby ensuring that the class initialisation is not subsequently re-run.

The end result of the processing of FIG. 3 is that a class has been loaded into a consistent and predictable state, and is now available to interact with other classes. In fact, typically at start up of a Java program and its concomitant Java VM, some 1000 objects are loaded prior to actual running of the Java program itself, these being created from many different classes. This gives some idea of the initial delay and overhead involved in beginning a Java application.

As will now be described in detail, the preferred embodiment of the present invention provides a set of callable routines and tools that allow a user to store away the state of an initialised Java application. The stored application is available for subsequent reloading, but without the start-up cost of initialisation. In other words, a "snapshot" can effectively be taken of an application at some user-defined point in time and saved for later use. The primary focus of this technique is therefore performance (i.e. reducing start-up time), but there are also other benefits which will be discussed later.

In order to save a Java application for subsequent restart, the following main issues must be addressed:

(a) all loaded classes and instances need to be identified.
(b) information about the Java VM threads needs to be stored.
(c) the processing must handle IO channels which have been opened by the application, for example local files or socket links to remote machines, and application GUI components.

Some of the relevant information is relatively straightforward to capture while other information is more difficult. In some circumstances the effort involved in capturing certain information may outweigh its value to a developer or user (this is particularly likely to be the case in relation to GUI components).

Considering first the storage of the state of an application and its Java VM (the restart will be described later), the save routine is implemented in the preferred embodiment as a Java class with native code. The user's Java application is then able to call a save method on this class once initialisation has reached a suitable (user-selected) point. Having the user code call the save method directly allows the developer a high level of control of the saved state.

Figure 4:
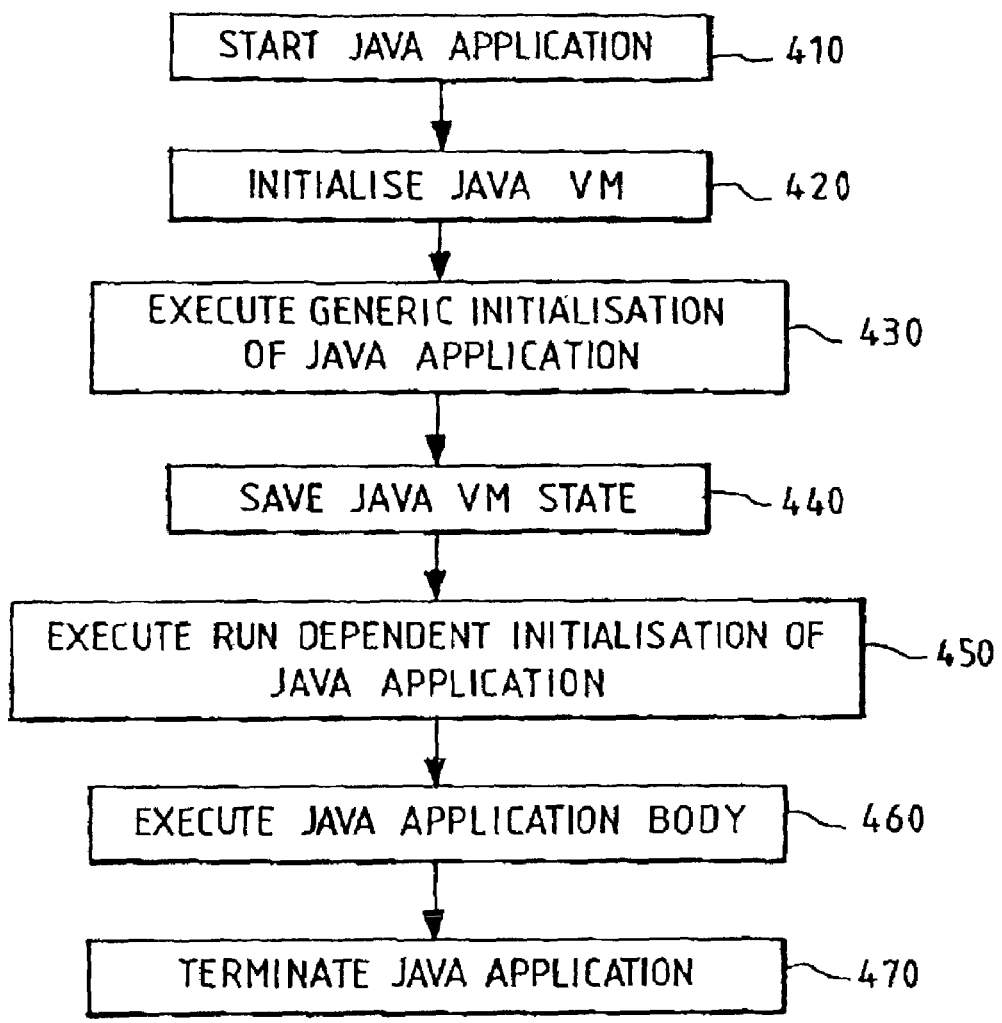
FIG. 4 is a flowchart providing an overview of the steps required to save a Java VM.

FIG. 4 is a flowchart illustrating the main operations associated with saving the state of an application. The rationale behind this flowchart is that the initialisation of the application can be split into two parts, the first part which is generic for each time the application is run, and the second part which is specific to a particular instance of the application. It is assumed that the application is to be saved in a state whereby the first part of the initialisation has been performed, but not the second part of the initialisation.

Thus the method commences with the start of the Java application whose state is to be saved (step 410), which in turn leads in standard fashion to the initialisation of the Java VM classes (step 420). This is followed by initialisation of the first part of the application classes, i.e. those for which the initialisation is regarded as generic across all instances of the application (step 430). We have now reached a position where the save operation itself can be performed (step 440), this being achieved by calling an appropriate method as discussed above.

Once the Java VM state has been saved, the second part of the initialisation can be performed, i.e. as dependent on this particular run of the application (step 450). The main body of the application can now be performed (step 460), and then finally the application terminates (step 470).

It will be appreciated that FIG. 4 shows a preferred sequence of events, but there are many variations. For example, it may not be desired to do any productive operations at the time of saving the Java VM state, but only when it is restored. In this case steps 450 and 460 would be effectively deleted from FIG. 4. There may also be reasons for wanting to perform some particular processing prior to saving the Java VM state, so that this processing would represent an additional step in-between steps 430 and 440.

One possible motive for such additional processing arises from the fact that, as previously explained, the Java specification does not fully define the time at which class loading is performed—rather, it only guarantees that it must have occurred prior to first active use of the class. Therefore, it may be desirable to perform some relatively trivial operation on the classes, such as accessing a class variable, prior to the save step (step 440), in order to ensure that the generic initialisations are indeed completed before the save operation. Alternatively, some Java VMs may support user control of the timing of loading, for example by providing a start-up option to enforce early initialisation.

Of course there is no absolute requirement that generic class initialisations have to be completed before the state of the Java VM is saved, since this initialisation can always be performed on restart. However, this would increase the start-up overhead at restart, and as previously explained the main objective of the serialisation is to reduce this start-up time.

As regards the classes that need to be specifically initialised for a particular instance of the application (i.e. in step 450 in FIG. 4), then a user will want to ensure that these are not initialised prior to saving the Java VM in step 440. This can be achieved by not referencing such classes prior to this point, since in accordance with the Java specification, the Java VM is not permitted to initialise a class until it has been referenced.

Thus it is envisaged that in most situations, the optimum approach for use of the present invention is that those parts of the initialisation which are expensive and run independently (produce the same Java VM state from one run to the next) are executed before the application's state is saved. A lazy approach to initialisation of the application (i.e. only loading classes as required) should be avoided. Although it does not cause a problem in terms of the save operation per se, it does reduce the benefit of taking the snapshot, since it leaves more initialisation to be performed at restoration time. Classes which are known to be needed later on in the application's execution can be included in the run-independent initialisation. Therefore the application should be designed to reference such classes before the snapshot is taken so that they are saved in the snapshot. One the other hand, application logic which is run- or input-dependent cannot be executed before the snapshot is taken as it would be frozen in the snapshot, rendering the restored application unresponsive to the input.

We will focus now on the details involved in saving the state of a Java VM, in other words on the operations that underlie step 440 in FIG. 4. In particular, the major parts of an application which need to be handled for a successful Java VM Store/Restore cycle will be identified and discussed (reference numbers associated with these parts relate to the components identified in FIG. 2). It should be noted that although the preferred embodiment described below adopts a straightforward and efficient ordering for the storage of the different parts, there is some flexibility here, and other embodiments may follow a different ordering.

Classes

As previously mentioned, all loaded classes are held as objects 145 on the heap 140, and may contain absolute references to instance objects, which need to be encoded for storage. Because the class objects are on the heap, they can effectively be treated in the same way as instance objects, as described below. Note that some classes are platform specific and for this reason (plus others discussed elsewhere) a store/restore of an application state must be regarded as platform specific. In other words, with reference to FIG. 1, the saved state of the Java VM 40 and application 50 will generally be tied to the particular operating system 30 on which it was originally obtained. Note that as previously mentioned, the class loaders in a Java VM are themselves Java classes, and can therefore be saved in substantially the same way as other classes.

The class storage area 160 (see FIG. 2) needs to be saved with the loaded classes. In particular, the class method table (corresponding to method block 172 in FIG. 2) contains pointers to the individual class methods. For each method there will be a pointer to the byte code (corresponding to method code 164) and optionally a pointer to the JIT-compiled code stored in JIT code area 185. The save routine is able to handle both byte code and native code. If the method has not been compiled by JIT compiler 190 then the save only stores the Java byte code. On the other hand, if the method has been compiled, then the native (compiled) code will be stored as well.

The JIT-compiled code for the method needs to be located and analysed to detect usage of absolute memory references. Relevant information from these addresses is then stored with the JIT-compiled code, so that the addresses can be properly adjusted when code is loaded back into memory. The complexity of this process is somewhat dependent upon the type of code created by the JIT.

In a preferred implementation, the user can request that the JIT is called to compile all non JIT-compiled methods immediately before the snapshot is taken. This "pre-save" JIT-compiling improves the performance of the restored application, since it minimises the number of classes that would later need JIT-compiling (and hence start-up delay).

Objects

All instance objects can be found from the Reference Queue of the Java VM. In turn each object may contain references to other objects. The problem with these "object to object" references is that they refer to absolute locations inside the heap. If these locations are stored and later reloaded into memory it may be possible to request the same area of the heap for a specific object but if the heap itself starts at a different location this may not be feasible. For this reason the "object to object" references need to be held in a relative format. One possibility is to modify the heap manager in the Java VM so that all heap references stored in objects are relative to the start of the heap. This has the disadvantage however that more machine cycles may be needed to load and store these addresses making the Java VM slower.

In the preferred embodiment, the addresses in the heap are translated at save time to a chain of reference addresses and then back again at restore. A vector of object references is utilised, the entries of which are initialised to 0 (null). As an object A (for example) is scanned, any reference found to S (for example) is entered into the S slot of the vector. The existing vector entry is placed in A's reference field to form a chain. The values stored are the relative location (offset) of the field from the start of the object (A) plus the accumulated length of all the objects already processed. (This value can be thought of as being equivalent to the offset from the start of the heap when the objects are reloaded).

Figure 5:
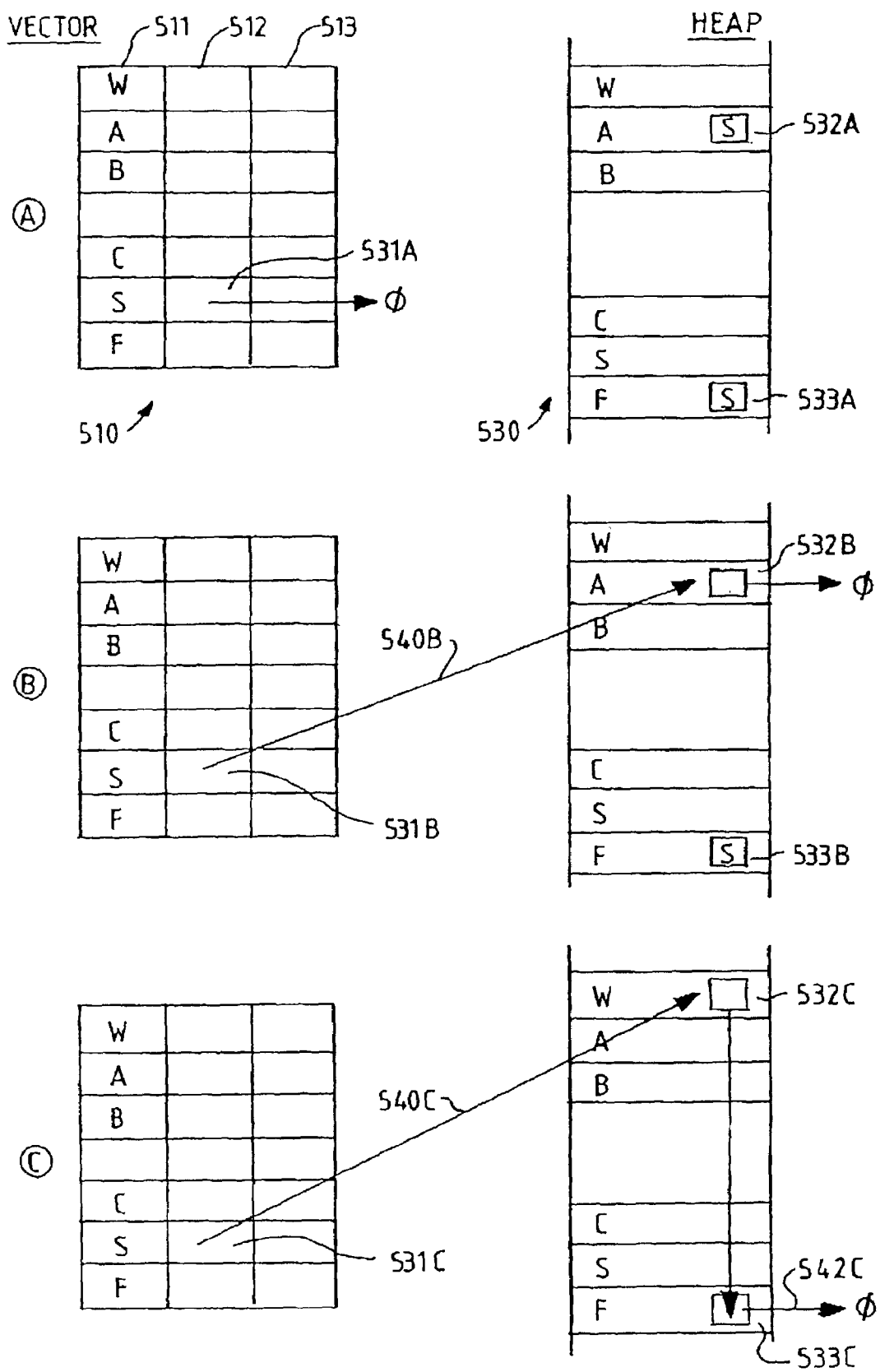
FIGS. 5A, 5B, and 5C illustrate the storage of relative heap references.

FIG. 5 illustrates this approach for storing heap addresses. Thus the first item is to create a vector or table 510 having three columns. Each object in turn in the heap is then identified from the system Reference queue, and added into the table 510, with one object entry per row of the table. The first column 511 is used to hold the identifier or reference number of an object, and the third column 513 is used to hold the length of the object. The actual contents of the object can now be copied over into the save file for the snapshot (not shown in FIG. 5).

The ordering of the objects within the save file in the preferred embodiment is the same as in the vector table, thereby allowing the location of any object to be determined by offset based on the total of object sizes of preceding objects; however, an additional column for object location could also be added (which would then mean that the ordering of the save file would not need to match that of the vector table). Note also that the order in which the objects are listed in the vector table does not necessarily have to match their order on the heap (although in the example of FIG. 5 this is actually the case).

References in the save file between objects must use relative addresses rather than absolute addresses, since the latter will not be meaningful at restore. Therefore, as shown in the sequence of diagrams FIG. 5A, 5B, and 5C, the heap is scanned to detect all inter-object references. In the example of FIG. 5A, two such references are present, one 532A from object A to object S, and one 533A from object F to object S. As each object reference is found, a linked list is built up for that object, which is headed from the second column 512 of the vector table 510. The initial setting of this column is to a null value (e.g. reference 531A for object S).

FIG. 5B illustrates the situation once the reference from object A to object S has been processed. The null pointer 531B in the second column for object S has been changed to reference object A, whose pointer 532B to object S has in turn been updated to null to denote the end of the queue. Therefore we now have a linked list of two objects (S and A). Next the reference 533C to object S in object F is found, and so object F must be added to the end of the linked list. This is accomplished by updating pointer 532C in object A from its null value to point to object F, and updating pointer 533C in object F to a null value (see FIG. 5C). This process is then continued until all object references in the heap have been replaced, at which point the vector table will contain the heads of a number of linked lists, one per object. Note that the replaced references are all stored in terms of offset from the current position.

It will be appreciated that there are many possible variants on the processing shown in FIG. 5. For example, the pointer updates from FIGS. 5B and 5C could be performed on the heap itself before the snapshot is taken, and then copied as part of the save procedure, or else performed directly on the save file. In addition, the relative addresses could be stored as offsets from the start of the save file, rather than the current position. More generally, although the linked list is a simple mechanism to facilitate inter-object references in the snapshot, the skilled person will be aware of other suitable data structures that could be used.

One benefit of the approach described above is that since the objects are saved on an object by object basis, with only relative addresses, this will effectively compact any holes in the heap as part of the snapshot process. Therefore on restore the heap will be in an optimum condition, since all objects can be loaded into contiguous memory.

One complication is that depending upon the memory management scheme implemented in the Java VM, objects in the heap may be "pinned". This situation can arise when Java Native Interface (JNI) code holds references to an object. In particular, pinned objects may be referenced by local "C" variables, stored on thread C-stacks. Unfortunately, unambiguously distinguishing these addresses from other values on the stack is difficult (i.e. it is not clear which values on the C-stack are addresses, and which are other data types such as integers). This same problem is also faced by the garbage collector in known Java VMs, since an object referenced from the C-stack cannot be safely deleted (garbage collected) without potentially compromising system integrity.

An existing mechanism to address this problem is for any JNI code that references an object to mark the object itself on the heap as pinned. This mechanism is also supported in the preferred embodiment of the invention, which means that there is no need to review the C stack itself for potential object references. Rather, the heap is scanned at the time of the snapshot to detect any objects which are marked as pinned. If there are any pinned objects, a warning is given concerning the relevant objects (plus thread information), and the program exits (no snapshot of the Java VM state is taken). The reason for this is that the addresses to the pinned objects on the C stack are absolute, and will no longer be valid when the heap is reloaded at restore time. Moreover, it is not possible to convert addresses on the C stack into relative format (as described above in relation to intra-heap pointers) because as already mentioned, there is no way of distinguishing addresses on the C stack from other data values such as integers. Thus there is a possibility, albeit very small, that what looks like a reference to a pinned object is, by an unfortunate coincidence, an unconnected integer. In this case automatically converting to a relative value would in fact result in corrupting the system.

There are certain ways to try to avoid this problem. For example, as a first measure, if there are any objects marked as pinned, then the C stack could be reviewed to confirm that there really are potential object references from the C stack; for example that the reference is to a known object boundary. If no such references are found, then even although an object is marked as pinned, it is not being referenced from the C stack at this precise instant, and so the snapshot can proceed.

In addition, there are only two possible origins for C code that would pin an object: in the application itself, or within the Java VM. The former is clearly within the control of the application developer, and it should be relatively straightforward for the user to avoid pinning any objects here by performing the save operation before any JNI code is utilised. As regards the latter, one possibility is to augment the Java VM so that as part of the snapshot process, an attempt is made to flush out all pinned objects caused by JNI code from the Java VM.

A further risk from using native code is that it could manipulate pointers (pointer arithmetic) or utilise memory outside the Java heap (via the malloc command of C), and it would be difficult to ensure that the relevant pointers are still valid at restoration. This therefore represents another form of restriction that applies to any use of native code (although it should not be a problem for JIT'ed code or Java VM native code).

Another item for consideration in relation to saving the heap is whether to perform a garbage collection (GC) cycle immediately prior to the save operation. This would involve using the garbage collector and finalisation mechanism to finalise any objects that were no longer being used. These objects can then be deleted, avoiding unnecessary storage in the snapshot, making the restore operation as quick as possible. Note that the amount of benefit obtained from a GC immediately prior to the snapshot will depend on the number of objects to be deleted at completion of the generic initialisation. This number will include both an essentially constant set of objects left over from system initialisation, and also an application dependent set. Accordingly, in the preferred embodiment, a pre-snapshot GC is a user option.

Threads

Saving the state of the Java VM requires a record for each thread of its state and the stack information. Therefore, in taking a snapshot of an initialised Java VM, all threads are halted, except the one taking the snapshot. This a relatively standard procedure, and is also used for example in a "stop-the-world" Garbage Collector. Once all the threads have been suspended, the Java VM thread list is examined. For each thread (both user and system), the following contents are recorded:

the C-stack
the Java stack (for Java threads)
the thread's execution state (i.e. program counter, stack frame, current register set etc.)

Since the save routine will have been initially invoked by one of the threads which will need to be saved, in the preferred embodiment the invoking thread spawns a subprocess to stop the Java VM threads and collect the thread information. This is a simpler approach than trying to record the state of our current thread.

Note that the C-stack needs to be unwound and encoded before saving, so that absolute addresses are replaced by symbolic reference. This unwinding (which is essentially in relation to code rather than objects) includes identifying the return addresses of C function calls stored in the stack. These addresses are then linked to a specific DLL and an offset address calculated. This needs to be done as we may not be able to specify the location in memory of the DLL once it is reloaded. The same is also true of the program counter. Information such as this concerning the state of threads is commonly provided by diagnostic facilities, and therefore can be obtained relatively easily. A further reason why recording thread information is not as difficult as may perhaps appear is that since each thread has been signalled to suspend, the system will be in a relatively simple state (and the snapshot routine will of course be aware of this state).

Object (heap) addresses held on Java stacks are translated into object reference numbers before the thread information can be saved. In the preferred embodiment, thread information is stored after heap information has been processed as described above, so that the object reference numbers have already been created at this stage. Both the C-stack and Java stack references are stored as a linked list. For example if three addresses (A, B, and C) are found that need to be stored in a relative format for later reconstruction, a linked list can be constructed to aid in identifying the addresses at restore time. Each address in the stack is replaced by two words, the first word being an offset to the next address needing to be reconstructed and the second the object reference number.

Figure 6:
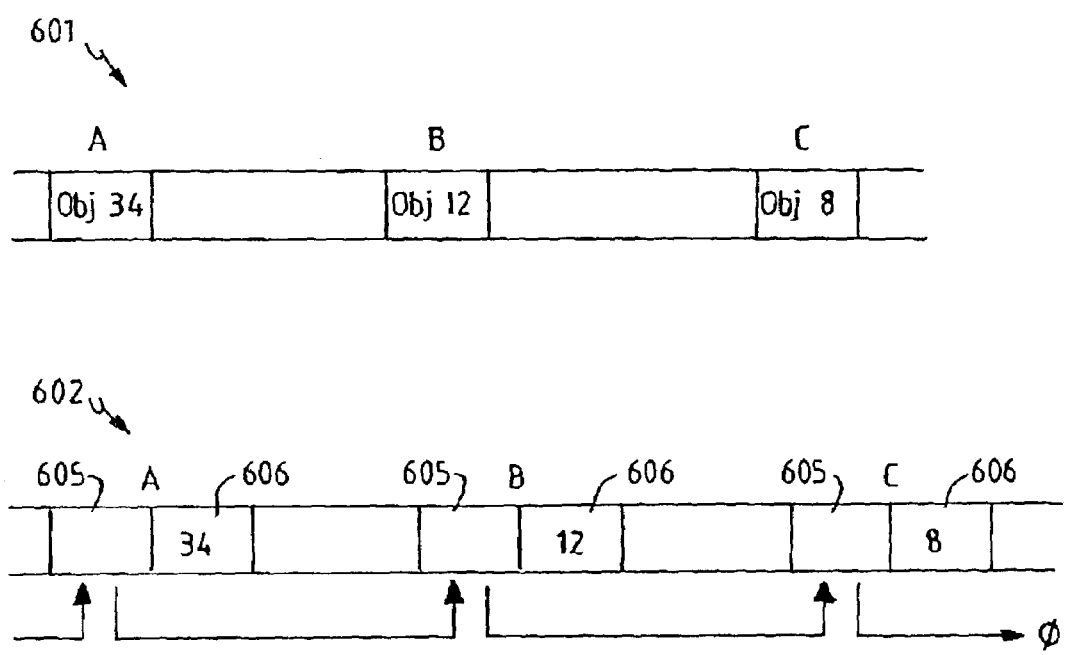
FIG. 6 illustrates the storage of relative addresses on the stack.

FIG. 6 illustrates how stack references are stored, with stack 601 illustrating the raw version, and stack 602 illustrating the corresponding saved version. Thus stack 601 contains object references A, B, and C, to objects 34, 12 and 8 respectively. For the snapshot, each reference A, B, and C is replaced by a pair of values. The second of these values 606 identifies the object, using the object reference number as stored in the first column of the vector table of FIG. 5, and from which an object position on the saved heap can be determined. The first value 605 in each pair contains a pointer to the next object reference, with the location of the first object reference (A) being stored separately, and the value for the final object reference (C) being set to null.

IO Channels & Socket Connections

The state of IO channels (e.g. to read and write to files) at the time the Java VM is serialized also needs to be recorded and saved. The majority of the information relating to open channels is held in Java objects on the heap. This information is noted so that on restoration of the application all open IO channels can be restored to their pre-save state. The information which must be stored includes: a list of channels opened, together with permissions (read/write etc.); and file position at time of save (at start, at end, other position etc.). It should be noted that IO channels opened or modified by user native code may not be recorded correctly and this needs to taken into consideration by the application writer who uses the save/restore routines. Similar information is stored for socket connections to remote machines, i.e. a list of sockets open; remote machine and socket address; and state of connection at time of save.

One difficult problem is guaranteeing the correct state of the remote machine at application reload time. There may also be problems with IO arrangements, for example if a previously utilised file has been modified or updated in-between the save and the store. Thus it is unlikely that IO channels and sockets can be saved with complete reliability—something the user should take into consideration.

GUI Components

The storage and reconstruction of Java GUI components based on the Abstract Window Toolkit (AWT) is difficult, since the implementation of the AWT is very platform specific. Rather, in the preferred embodiment, the heap scanning component of the save routine checks for AWT GUI-related objects, and if any are found the user is warned that data may be lost.

If it were desired to extend the save functionality to AWT components, the feasibility of such an operation is dependent upon the functionality provided by a platform's graphics libraries. It is relatively straightforward to save the Java GUI objects, since they are located in the heap. However, the AWT architecture is based on each Java GUI object having a corresponding "peer" object, implemented in native code, and the state of these peer objects also needs to be saved. For example on AIX, the save routine needs to interrogate the X Window System to determine: which widgets exist, their attributes, and their relationship to each other; information about which Java objects they relate to would need to be obtained from the Java VM.

More recent Java GUI components are implemented using Swing, part of the Java Foundation Classes (JFC). These are based ultimately on a very restricted subset of the AWT, and therefore it is much more practicable to provide full support for the saving and restoration of Java applications that use exclusively Swing for their GUI.

DLLs Loaded and Native Code Being Run

Dynamic link libraries (DLLs) are utilised in a Java environment to provide platform functionality for the Java VM itself, and also optionally by applications that contain JNI code. In order to save the state associated with such DLLs, all loaded DLLs are recorded with their base addresses, and if they contain JNI code, all references to them from class loaders and NativeLibrary classes are also recorded (NativeLibrary classes provide the mechanism for a Java application to access the DLLs).

This approach ensures that when the DLL is reloaded (after restore) the information held in the Java objects can be adjusted correctly. More particularly, in the preferred embodiment a table is created containing: the name of the DLL; its load location (memory address); and the NativeLibrary class association (in the case of DLLs containing JNI code). The NativeLibrary association is stored as the offset of the Java object from the start of the stored heap. Consequently, once the heap is restored it simply requires adding the base address of the new heap to this value to obtain the location of the Java object which needs updating. The loaded location of the DLL is needed to convert back addresses found when processing, for example, C-stacks (return addresses etc.) and JNI code, as discussed above.

In the preferred embodiment it is not envisaged that the DLL itself is incorporated into the snapshot, but will rather be independently available at restoration. Thus the snapshot itself only needs to store the name of the DLL. This can be stored in either fully qualified or short form. Storing a short name will allow flexibility at reload time whereas a fully qualified name would be more secure, guaranteeing that the native code comes from the correct location (correct version etc.). Note that there is no technical reason why the DLL itself could not also be included within the snapshot, although there may be some copyright licensing issues, depending on the source of the DLL.

Java VM System Components

There are a number of run-specific variables and data structures used by the components and sub-components of the Java VM such as the garbage collector or JIT, which need to be saved if, on reload, the Java VM is to function correctly. The information is often specific to a component and its location may change from one Java VM release to the next. Thus each component of the Java VM must be extended to include a save and restore function. The first captures the component's current state and places it in a data structure which it will return to the calling save routine. The data is opaque to the save routine which adds the data to the save file. On reload the data structure is read from the save file and passed to the component which generated it. Note that in the preferred embodiment, it is possible to override certain values at save and at restore time, such as initial heap size and stack sizes.

As examples of handling the Java VM system components, this includes the system class loader (the CL subcomponent 204 in FIG. 2), which would need to save its cache table (180 in FIG. 2), and also the locking system would need to save the monitor pool and associated hash table (142 and 141 respectively in FIG. 2).

It will be appreciated in this context that the various system components are not saved in a completely ready to run state, since these are effectively running on the underlying operating system. Instead they are given a path for accelerated start-up, whereby some of the major components of the Java VM, such as the heap and its contents, are created en bloc rather than in piecemeal fashion.

Example Save Interface

The following interface gives an indication of the callable methods available to the application writer to save the state of an application using the approach described above:

```
Class;
    SerialiseJVM
Methods;
    CheckPinning ()                         // this identifies
    any pinned
    objects and will exit if any are
        found //
    forceJIT(options)                       // this ensures that all
    code
    compilation is performed before
        restore //
    ForceFinalizer(options)                 // this runs the
    Finalizer method                                          of
    appropriate objects allowing
        them to be deleted (garbage
            collected), so that they don't
                need to be saved
    unnecessarily //
    heapSize(int size)                      // this determines
    heap size //
    stackSizes(int C-size, int J-size)      // this determines
    stack size //
    snapshot(string filename)               // this takes the
    snapshot //
```

Note that some or all of these methods may in fact be included (possibly as options) in the main snapshot method; the extent to which the methods are separated is largely a question of user convenience.

Figure 7:
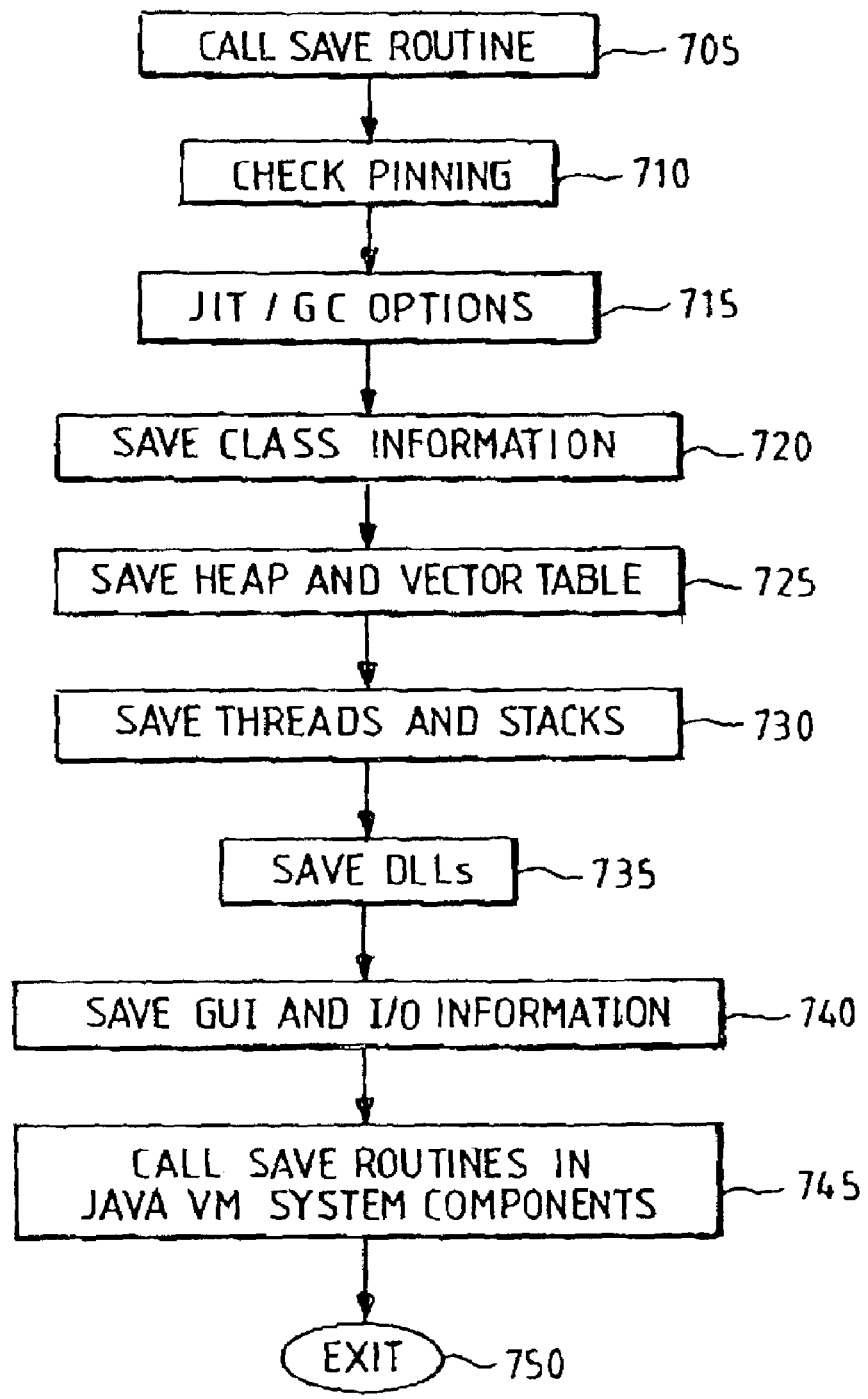
FIG. 7 is a flowchart depicting the save operation.

FIG. 7 is a flowchart summarising the above save operation. Thus processing starts with the application calling the save routine (step 705) and performing an initial check for pinned objects (step 710), including any rectification action if possible. Assuming that there are no pinned objects, the method can now proceed to step 715, where certain user options are determined, in particular whether to perform what is effectively a pre-emptive garbage collection and code compilation immediately prior to the snapshot. Note that although this will add more time to the save routine, this may be more than recovered later, particularly if the same save file is restored multiple times.

We are now ready to start the save operation proper, and this commences with saving first the class information (step 720), and then the heap (step 725), both as described above. Next information is saved about the current threads, including the stacks (step 730), plus loaded DLLs (step 735), followed by information about IO channels and GUI components (step 740). Finally the method concludes with calling the JVM system components to perform their individual save operations (step 745), before the save routine eventually terminates (step 750) with the completed snapshot. Note that in the preferred embodiment, the user can determine what action occurs upon termination of the snapshot routine by setting a parameter in the initial save call. The two available options are either to return control back to the application for continued processing, or else to terminate Java VM, so that the snapshot routine is effectively the end of the application.

Restore

Having considered the snapshot operation to save the state of the Java VM, we will now look in more detail at how to restore it. The snapshot taken as described above will be platform specific, which means that a snapshot taken on one machine will not be loadable by another. The reason for this is that a number of system classes and Java VM states are specific to a Java VM for a particular platform. To be able to load a snapshot taken on AIX (for example) on NT would require some of the Java VM information to be translated into a generic (cross platform) form. On reload the generic information would need to be translated back into its platform specific form. This could involve a significant time cost, reducing (and quite possibly outweighing) the benefit of the restore.

Figure 8:
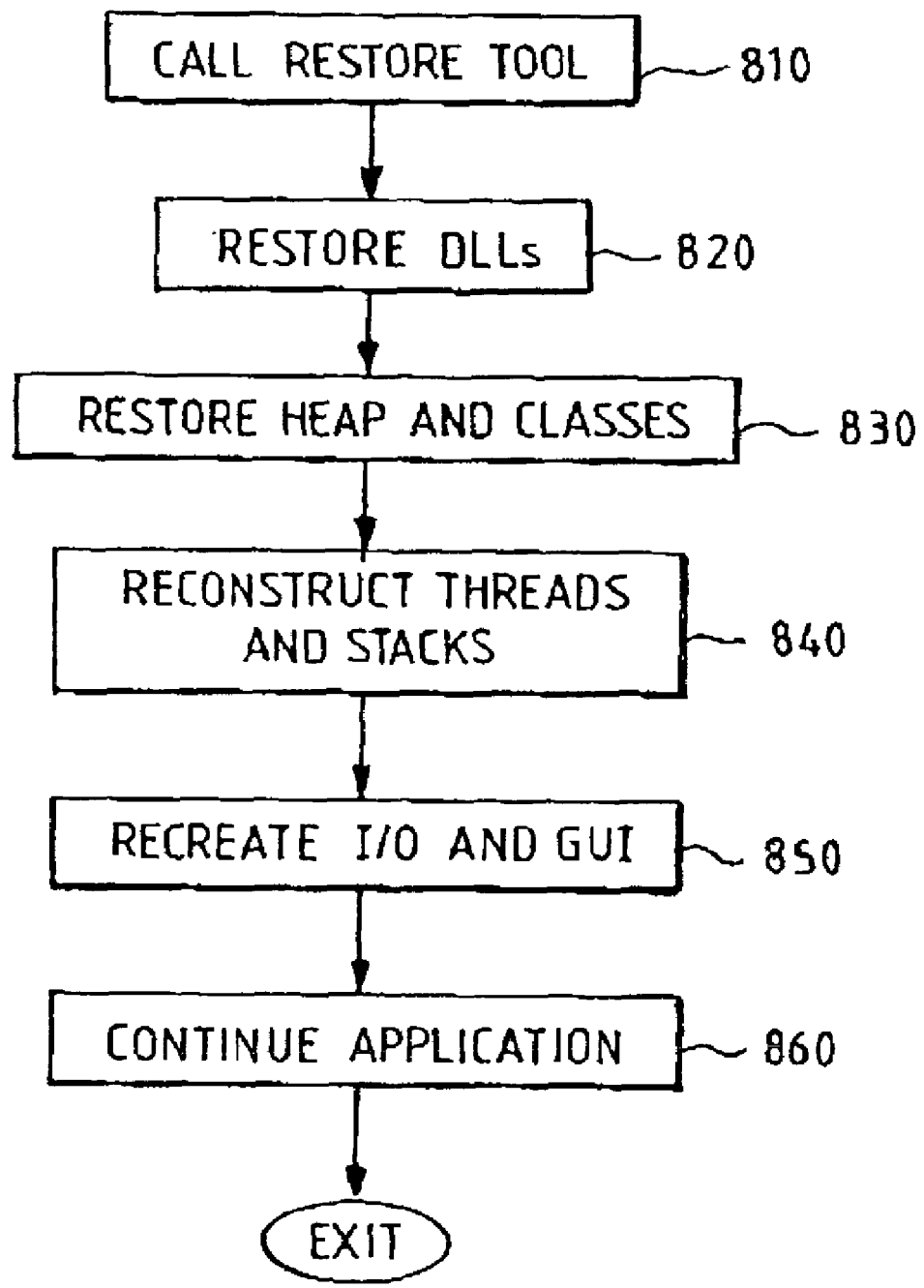
FIG. 8 is a flowchart depicting the restore operation.

In the preferred embodiment, the saved state is loaded by a special "javaload" tool, which loads the stored application into a Java VM, bypassing all the initialisation normally associated with bringing up a Java VM. The reloading of the application is performed in stages. The various components of the Java VM are provided with restore commands to restart themselves using the saved information. These components are launched in parallel with the major structures such as the heap and stacks being recreated (as shown in FIG. 8 below), according to the desired timing between the two (e.g. the CL class loader is launched at the same time as the classes are being reconstructed). Note that in order to optimise the load time, the information stored in the snapshot is preferably structured, taking into account the reload order described below.

FIG. 8 depicts the operation of the restore tool. After it has been invoked (step 810), the information covering the general state of the application, DLLs loaded etc., is retrieved. Each DLL recorded in the save file can then be loaded into memory (step 820). The load address of each DLL is added to the table of loaded DLLs for later use. The heap is loaded next, as a single block (step 830). The table of object lengths and reference chains is used to reconstruct the object references inside each saved object. Class objects are also loaded at this time and their method tables are restored. This may involve reloading and rebuilding of JIT-compiled code. Any adjustments needed to heap objects (native libraries) to accommodate DLLS loaded are made now. Note that there is some discretion as to heap size, in that this does not necessarily have to match the original heap size. Rather it may for performance reasons be desirable to set the new heap size to some predefined multiple of the total size of the stored objects to be reconstructed into the heap (clearly the new heap must be large enough to accommodate all the saved objects).

Following the heap, thread information is loaded, and used to reconstruct the C-stack, Java stack and thread state (program counter, registers etc.) (step 840). The DLL information loaded earlier is needed to adjust the addresses in the C-stack. The object table (loaded with the heap information) is utilised to rebuild the object addresses held on the Java stacks. The system threads are now created and the saved thread information used to set their states. As the heap will have been initialised by this stage, it is possible to reconstruct the object addresses on the Java stacks. This leaves the threads in a "ready-to-run" state.

Finally, IO channels and socket connections are restored (step 850). It should be noted that this stage has the possibility of failure due to uncontrollable events (files having been deleted, remote machines no longer being available etc.)

At the conclusion of the above operations, the suspended application is now ready to run, and control is passed to execution engine of the Java VM (step 860). Processing of the application then resumes at the point in the application immediately following the call to the snapshot routine.

The ability to save the state of a Java application in a form that could be used for later restoration has a wide range of potential uses. Note in particular that it is possible to produce one or more copies of the snapshot of the original Java VM. These can then be started successively one after another, or altogether (or any desired combination of both in series and in parallel). This approach is especially suitable in a transaction processing environment, such as described earlier, where a fresh Java VM is conventionally launched for each new transaction. The present invention allows a snapshot of a generically initialised application (transaction) to be saved, and then duplicated for each new transaction to be performed. Typically this would be controlled by the middleware software 45 (see FIG. 1) which would be responsible for creating the initial snapshot, and then launching a reinitialised Java VM from the saved snapshot for each new transaction. The restore operation can be performed more quickly than initialisation of a new Java VM, thereby improving overall transaction throughput.

Another important application of the present invention is in the field of Java service. For example the snapshot routine could be hooked into the signal handler in the Java VM which traps system errors. The snapshot would record the state of the Java VM and application for later analysis. This has some similarities to core files available on some platforms, such as the AIX operating system from IBM Corporation, which record the system state for subsequent debugging and diagnostics. Note however that with the core files, unlike the present invention, there is no concept of being able to restart the system from a saved state: i.e. they are only useful in the sense of a post mortem. In addition core files are generally only useful for analysing applications running on the operating system itself, rather than in a virtual machine supported by the operating system.

It should be recognised that in the preferred embodiment, the snapshot facility is not generally capable of handling the complete range of functionality that may be utilised in a Java program (e.g. in relation to GUI components, as described above). Therefore, an application intending to use the save and restore operation as taught herein must be designed taking into consideration the limitations which have been discussed. It will be appreciated of course that this situation is essentially no different from any other tool or library that may be used by an application developer, which all tend to have their own restrictions.

Of course, such limitations only apply up until the time that the snapshot is taken. Therefore, if the snapshot is intended to occur at a particular stage (completion of generic initialisation), then the above restrictions can be dropped for subsequent processing of the application. Thus if the application needs to use particular GUI objects, this is probably best accomplished by suspending their introduction until the after the snapshot, thereby effectively including them in the run-dependent initialisation.

The skilled person will be aware of many possible variations on the embodiment described above. For example, the invention has been described primarily in relation to Java in a server environment, but it will be understood that it is also applicable to the client environment, and potentially applies to any other language operating on a virtual machine, especially when it is necessary to have a quick start-up of applications. This is particularly true for handheld devices, consumer devices, and so on, where users are accustomed to quasi-instantaneous start-up times (certainly much shorter than current PCs), and which often run only a very limited set of applications. For these devices therefore, the snapshot files for various desired applications could be preloaded onto the devices (having being created elsewhere by the manufacturer).

In addition, although the invention has been described in relation to saving the state of a virtual machine having heaps, stacks and threads, it will be appreciated that it also encompasses machine architectures having constructs which are nominally different, but which still perform the analogous functions of providing program memory and execution context. Such systems will also benefit from being able to save the state of a virtual machine and application for later restoration, as disclosed herein.

Thus many of the details of the systems and processes utilised are exemplary only, and can be varied according to particular circumstances.

It will be appreciated therefore that there is a range of modifications to the embodiments described herein that will be apparent to the skilled person yet remain within the scope of the invention.

The invention claimed is:

1. A method of saving, in suspended form, a state of an application that is running on a software virtual machine on a computer system, the method comprising the steps of:
    placing the software virtual machine and the application into a state of suspension;
    determining a current state of components of the application that is running on the virtual machine, including heap, threads, and stack;
    in response to determining that there are any pinned objects on the heap, abandoning creation of a save file for the current state of components of the application that is running on the virtual machine, wherein pinned objects are objects on the heap that are referenced from the stack;
    in response to determining that there are no pinned objects on the heap, storing the current state of components of the application, which is running on the virtual machine, into a save file; and
    in response to determining that there are no pinned objects on the heap, creating a vector table that describes contents of the heap, wherein the vector table contains, for each object in the heap, an identifier number for the object in the heap, the length of the object in the heap, and the object in the heap itself, and wherein an order of objects in the vector table is identical to an order of objects in the heap.

2. The method of claim 1, further comprising:
    forcing a compilation of at least some states of said application prior to determining the current state of the components of the virtual machine.

3. The method of claim 1, further comprising the step of performing a garbage collection on the heap immediately prior to determining the current state of the components of the virtual machine.

4. The method of claim 1, further comprising the step of replacing absolute references on the heap by relative references before storing the save file.

5. The method of claim 4, further comprising the step of creating a linked list of the relative references for each object.

6. The method of claim 4, further comprising the step, responsive to said call, of stopping the current thread and initiating a new thread specifically to perform the save operation.

7. The method of claim 4, further comprising the step of replacing absolute references by symbolic references for code references from the stack.

8. The method of claim 4, further comprising the step of interacting with various subsystems of the virtual machine to obtain from them state information to be recorded in the save file.

9. The method of claim 4, further comprising the step of continuing with execution of the application, once the save file has been stored.

10. The method of claim 4, further comprising the step of restoring the suspended application running on the software virtual machine on the computer system.

11. The method of claim 10, wherein the step of restoring includes recreating the components of the virtual machine, including heap, threads, and stack, before restarting the application.

12. The method of claim 1, further comprising:
saving, into the save file, Input/Output (IO) channel information, wherein the IO information includes a list of channels opened by the application, IO permissions granted to the application, and socket connection information.

13. The method of claim 12, wherein the socket connection information includes a list of sockets that are open for the application when the save file is saved.

14. The method of claim 1, further comprising:
saving, into the save file, a garbage collector and a Just In Time (JIT) compiler used by the software virtual machine.

15. A save tool, executing on a computer system, for storing a suspended state of an application running on a software virtual machine on the computer system, said save tool comprising:
means for placing the software virtual machine and the application into a state of suspension;
means for determining a current state of components of the application that is running on the virtual machine, including heap, threads, and stack;
means for, in response to determining that there are any pinned objects on the heap, abandoning creation of a save file for the current state of components of the application that is running on the virtual machine, wherein pinned objects are objects on the heap that are referenced from the stack;
means for, in response to determining that there are no pinned objects on the heap, storing the current state of the application, which is running on the virtual machine, into a save file; and
means for, in response to determining that there are no pinned objects on the heap, creating a vector table that describes contents of the heap, wherein the vector table contains, for each object in the heap, an identifier number for the object in the heap, the length of the object in the heap, and the object in the heap itself, and wherein an order of objects in the vector table is identical to an order of objects in the heap.

16. The save tool of claim 15, further comprising:
means for forcing a compilation of at least some states of said application prior to determining the current state of the components of the virtual machine.

17. The save tool of claim 15, further comprising means for performing a garbage collection on the heap immediately prior to determining the current state of the components of the virtual machine.

18. The save tool of claim 15, further comprising means for replacing absolute references on the heap by relative references before storing the save file.

19. The save tool of claim 18, further comprising means for creating a linked list of the relative references for each object.

20. The save tool of claim 15, further comprising means, responsive to said call, for stopping the current thread and initiating a new thread specifically to perform the save operation.

21. The save tool of claim 15, further comprising means for replacing absolute references by symbolic references for code references from the stack.

22. The save tool of claim 15, further comprising means for interacting with various subsystems of the virtual machine to obtain from them state information to be recorded in the save file.

23. The save tool of claim 15, further comprising means for restoring the suspended application running on the software virtual machine on the computer system.

24. The save tool of claim 23, wherein the means for restoring includes means for recreating the components of the virtual machine, including heap, threads, and stack, before restarting the application.

25. A computer program product comprising program instructions encoded in machine-readable format on a tangible physical computer readable medium, said instructions when loaded into a computer system allowing an application running on a software virtual machine on the computer system to be saved in a suspended form by implementing the steps of:
placing the software virtual machine and the application into a state of suspension;
determining a current state of components of the application that is running on the virtual machine, including heap, threads, and stack;
in response to determining that there are any pinned objects on the heap, abandoning creation of a save file for the current state of components of the application that is running on the virtual machine, wherein pinned objects are objects on the heap that are referenced from the stack;
in response to determining that there are no pinned objects on the heap, storing the current state of components of the application, which is running on the virtual machine, into a save file; and
in response to determining that there are no pinned objects on the heap, creating a vector table that describes contents of the heap, wherein the vector table contains, for each object in the heap, an identifier number for the object in the heap, the length of the object in the heap, and the object in the heap itself, and wherein an order of objects in the vector table is identical to an order of objects in the heat.

26. The computer program product of claim 25, further implementing a step of forcing a compilation of at least some states of said application prior to determining the current state of the components of the virtual machine.

27. The computer program product of claim 25, further implementing the step of performing a garbage collection on the heap immediately prior to determining the current state of the components of the virtual machine.

28. The computer program product of claim 25, further implementing the step of replacing absolute references on the heap by relative references before storing the save file.

29. The computer program product of claim 28, further implementing the step of creating a linked list of the relative references for each object.

30. The computer program product of claim 28, further implementing the step, responsive to said call, of stopping the current thread and initiating a new thread specifically to perform the save operation.

31. The computer program product of claim 28, further implementing the step of replacing absolute references by symbolic references for code references from the stack.

32. The computer program product of claim 28, further implementing the step of interacting with various subsystems of the virtual machine to obtain from them state information to be recorded in the save file.

33. The computer program product of claim 28, further implementing the step of continuing with execution of the application, once the save file has been stored.

34. The computer program product of claim 28, further implementing the step of restoring the suspended application running on the software virtual machine on the computer system.

35. The computer program product of claim 34, wherein the step of restoring includes recreating the components of the virtual machine, including heap, threads, and stack, before restarting the application.

36. A method for saving states of an application in a software virtual machine, the method comprising:
   calling a save routine;
   performing an initial check for pinned objects, wherein pinned objects are objects in a heap that are referenced by a stack;
   in response to determining that there are pinned objects, cancelling a saving of the application;
   in response to determining that there are no pinned objects, saving;
      a garbage collector and a Just In Time (JIT) compiler used by the software virtual machine,
      class information for the application,
      the heap, wherein the heap contains objects that have been processed by the application,
      threads of the application,
      stacks used by the application,
      Dynamic Link Libraries (DLL) used by the application,
      state information for Input/Output (IO) channels used by the application, and
      components of a Graphical User Interface (GUI) that supports utilization of the application; and
   in response to determining that there are no pinned objects on the heap, creating a vector table that describes contents of the heap, wherein the vector table contains, for each object in the heap, an identifier number for the object in the heap, the length of the object in the heap, and the object in the heap itself, and wherein an order of objects in the vector table is identical to an order of objects in the heap.

* * * * *